United States Patent
Kuramoto (10) Patent No.: US 8,254,051 B2
(45) Date of Patent: Aug. 28, 2012

(54) DISK DRIVE AND METHOD FOR MEASURING CLEARANCE BETWEEN A HEAD AND A DISK IN A DISK DRIVE

(75) Inventor: Kenichi Kuramoto, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 112 days.

(21) Appl. No.: 12/832,802

(22) Filed: Jul. 8, 2010

(65) Prior Publication Data

US 2011/0007416 A1 Jan. 13, 2011

(30) Foreign Application Priority Data

Jul. 8, 2009 (JP) ................. 2009-162262

(51) Int. Cl.
*G11B 5/60* (2006.01)
(52) U.S. Cl. .......................................... 360/75
(58) Field of Classification Search .................. None
See application file for complete search history.

(56) References Cited

U.S. PATENT DOCUMENTS

| | | | | |
|---|---|---|---|---|
| 6,700,723 | B2 * | 3/2004 | Li | 360/53 |
| 6,906,878 | B2 | 6/2005 | Smith et al. | |
| 2007/0268615 | A1 * | 11/2007 | McFadyen et al. | 360/75 |
| 2008/0165443 | A1 * | 7/2008 | Moline | 360/25 |
| 2009/0257145 | A1 * | 10/2009 | Tsuyama | 360/75 |

FOREIGN PATENT DOCUMENTS

| | | |
|---|---|---|
| JP | 2002133769 | 5/2002 |
| JP | 2003141832 | 5/2003 |
| JP | 2004014092 | 1/2004 |
| JP | 2004303318 | 10/2004 |
| JP | 2007087490 | 5/2007 |

* cited by examiner

*Primary Examiner* — Hoa T Nguyen
*Assistant Examiner* — James L Habermehl (57) ABSTRACT

A disk drive. The disk drive includes a disk, a head, a head-slider, a moving mechanism, and a controller. The head is configured to access the disk. The head-slider includes the head, and is configured to fly in proximity to a recording surface of the disk. The moving mechanism is configured to move the head-slider over the disk, and to support the head-slider. The controller is configured to read out at least one from a plurality of clearance-measurement data strings from the recording surface of the disk using the head, and to calculate a clearance between the head and the disk from clearance-measurement results obtained from a plurality of resolutions with different frequency components.

14 Claims, 4 Drawing Sheets

| LEGEND: | |
|---|---|
| ELEMENT NUMBER | DESCRIPTOR |
| 17 | TEMPERATURE SENSOR |
| 21 | RW CHANNEL |
| 22 | MOTOR-DRIVER UNIT |
| 51 | HOST |

| LEGEND: | |
|---|---|
| ELEMENT NUMBER | DESCRIPTOR |
| X-AXIS | LOG OF TIME |
| Y-AXIS | CHANGES TO KGRAD |
| UPPER CURVE | FIRST DATA STRING (HIGH-FREQUENCY DATA STRING) |
| LOWER CURVE | SECOND DATA STRING (LOW FREQUENCY DATA STRING) |

DISK DRIVE AND METHOD FOR MEASURING CLEARANCE BETWEEN A HEAD AND A DISK IN A DISK DRIVE

CROSS-REFERENCE TO RELATED APPLICATION

This application claims priority from the Japanese Patent Application No. 2009-162262, filed Jul. 8, 2009, the disclosure of which is incorporated herein in its entirety by reference.

TECHNICAL FIELD

Embodiments of the present invention relate to a disk drive and method of measuring a clearance between a head and a disk in the disk drive.

BACKGROUND

Devices which use disks with a variety of formats such as optical disks, magneto-optical disks, and flexible magnetic-recording disks are known in the art; but, of these, the hard-disk drive (HDD) is widely used, not only in computer systems, but also in electronic equipment such as recording and playback devices for video images and satellite navigation systems.

Magnetic-recording disks used in an HDD are provided with a plurality of data tracks and a plurality of servo tracks formed concentrically. Each servo track comprises a plurality of servo sectors having data addresses. Moreover, each data track comprises a plurality of data sectors which contain user data. The data sectors are recorded between the servo sectors which are divided around the circumference of the magnetic-recording disk.

The HDD has a rotary actuator that rotates back and forth over the magnetic-recording disk; the rotary actuator includes a head-slider. The HDD reads out the address data from the servo sectors using the head-slider, the rotary actuator being controlled on the basis of this address data. By this means the HDD positions the head-slider over a desired data track, and writes data to, or reads data back from, this track.

To increase the magnetic-recording density of a magnetic-recording disk, both the clearance, which is a spacing, between the magnetic-recording disk and the magnetic-recording head that flies in proximity with the recording surface of the magnetic-recording disk, and the changes to this clearance are reduced. Various mechanisms have been proposed to adjust this clearance. One of these provides the head-slider with a heater, adjusting the clearance by heating the magnetic-recording head with this heater. As used herein, this technology is referred to as thermal fly-height control (TFC). With TFC, current is applied to the heater to heat it, causing the magnetic-recording head to project due to thermal expansion. By this means the clearance between the magnetic-recording disk and the magnetic-recording head can be reduced. In addition, methods are known which adjust the clearance between the magnetic-recording head and the magnetic-recording disk using a piezoelectric element, or using a Coulomb force generated between the head-slider and the magnetic-recording disk.

In addition to varying with changes in temperature, clearance can also vary with changes in pressure, which may be produced by changes in the altitude at which the HDD operates. To adjust clearance more accurately, clearance may be adjusted with changes in pressure. As pressure drops, the clearance between the magnetic-recording head and the magnetic-recording disk reduces. For this reason the HDD controls the clearance adjustment mechanism according to pressure changes, which may occur with changes in altitude, and maintains the clearance at an approximately fixed value.

The operation of the HDD is highly dependent on temperature, and in general HDDs are provided with a temperature sensor as a temperature detecting means. The HDD can use the temperature detected by the temperature sensor in adjusting the clearance. In the same way, pressure sensors, or alternatively, altitude sensors, are known as a means of measuring pressure. However, the use of a pressure sensor increases the number of parts required for an HDD. At the same time it also increases the cost of the HDD. However, as described above, clearance varies with changes in the pressure. Thus, within the HDD, changes in pressure can be measured from changes in clearance. HDD's perform clearance adjustment from pressure data calculated from clearance measurement values.

In addition to changes in pressure, extreme changes in humidity and changes in the internal structure of the rotary actuator, or head-slider, which may occur with increased use of the HDD, can lead to changes in the clearance. To more accurately control all the various origins of clearance variation, it is of interest to engineers and scientists engaged in HDD manufacturing and development to determine the variety of factors that may affect clearance, and to adjust clearance accordingly.

SUMMARY

Embodiments of the present invention include a disk drive. The disk drive includes a disk, a head, a head-slider, a moving mechanism, and a controller. The head is configured to access the disk. The head-slider includes the head, and is configured to fly in proximity to a recording surface of the disk. The moving mechanism is configured to move the head-slider over the disk, and to support the head-slider. The controller is configured to read out at least one from a plurality of clearance-measurement data strings from the recording surface of the disk using the head, and to calculate a clearance between the head and the disk from clearance-measurement results obtained from a plurality of resolutions with different frequency components.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

DESCRIPTION OF EMBODIMENTS OF THE PRESENT INVENTION FOR A DISK DRIVE AND A METHOD FOR MEASURING CLEARANCE BETWEEN A HEAD AND A DISK IN THE DISK DRIVE

With relevance to embodiments of the present invention, the hard-disk drive (HDD) periodically measures and confirms clearance, or alternatively, the changes in the clearance. Thus, clearance is measured in a number of different ways with the HDD; and, a variety of methods are known for measuring clearance. One effective method among these is to measure the clearance from the amplitude of the read-back signal from the magnetic-recording head. In general, as clearance decreases, the signal strength of the read-back signal increases; and, as the clearance increases, the signal strength of the read-back signal decreases. It is thus possible to measure clearance with reference to these changes in signal strength.

One method of measuring clearance from changes in the strength of the read-back signal makes reference to the gain of a variable gain amplifier. When the signal strength of the read-back signal increases, the gain of the variable gain amplifier decreases. The HDD is thus able to measure signal strength and clearance by referring to the gain of a variable gain amplifier.

Alternatively, a method of measuring clearance that is more accurate than using variable gain is known in the art that specifies clearance from the resolution of the frequency components of the read-back signal. Resolution can be expressed as the ratio between specific low-frequency signals and high-frequency signals in the read-back signal, which is one method of measuring clearance using the signal strength of the read-back signal. When clearance decreases, the amplitude of high-frequency components in the read-back signal becomes larger than the amplitude of the low frequency components, and resolution is increased. Conversely, where clearance increases the amplitude of the high-frequency components in the read-back signal becomes smaller than the amplitude of the low frequency components, and resolution worsens.

With relevance for embodiments of the present invention, to measure clearance using the read-back signal, the read element reads out a data string from the magnetic-recording disk. This clearance-measurement data string is a data string suitable for this method of measurement, and is written to the magnetic-recording disk in advance during the manufacture of the HDD, or alternatively, is written in using a write element each time clearance is measured. Where the clearance-measurement data string is written in and read out repeatedly, there is a greater variation in measurement than where the same data string is repeatedly read out. Thus, to ensure more accurate measurement of the clearance, a measurement data string is repeatedly used that has been written once.

However, by continuing to use the same measurement data string, an issue different from the variation in measurement occurs. This is thermal demagnetization. The direction of magnetization in the magnetic-recording disk varies with thermal energy. As a result, when a long time has elapsed after loading, the direction of magnetization of the data in the measurement data string will change; and, the signal amplitude read out will also change.

As described above, resolution can be expressed as a ratio between high-frequency signal amplitude and low-frequency signal amplitude. As long as the low-frequency signal amplitude and high-frequency signal amplitude decrease in the same way with thermal demagnetization, the value measured for the resolution does not change. However, the effect of thermal demagnetization is different depending on the frequency of the data string. Specifically, when the recording magnetization is in the in-plane direction, the amplitude of high frequencies decreases more; and, when the recording magnetization is perpendicular to the plane, the amplitude of lower frequencies decreases more. Even in the case where the actual clearance is the same, thermal demagnetization causes a variation in the value of clearance measurement that is based on resolution.

Inaccurate measurement of clearance leads to errors in the adjustment of clearance; for when clearance is too small, the magnetic-recording head can come into contact with the magnetic-recording disk causing damage to the head-slider and the magnetic-recording disk, or alternatively, a hard error, which is a term of art for a non-recoverable error, can occur due to contact between magnetic-recording head and magnetic-recording disk, when reading and writing are done without the proper clearance margin. Conversely, if clearance is too large the writing strength will weaken, leading to read errors.

Thus, embodiments of the present invention provide a technology which can prevent errors in measurement due to thermal demagnetization in the clearance-measurement data string of the magnetic-recording disk, as well as reducing variation in clearance measurement using the read-back signal.

In accordance with embodiments of the present invention, the disk drive includes a disk, a head, a head-slider, a moving mechanism, and a controller. The head is configured to access the disk. The head-slider includes the head, and is configured to fly in proximity to a recording surface of the disk. The moving mechanism is configured to move the head-slider over the disk, and to support the head-slider. The controller is configured to read out at least one from a plurality of clearance-measurement data strings from the recording surface of the disk using the head, and to calculate a clearance between the head and the disk from clearance-measurement results obtained from a plurality of resolutions with different frequency components. By this means, in accordance with embodiments of the present invention, the effect of deterioration in clearance-measurement data strings is reduced on the clearance measurement.

In accordance with one embodiment of the present invention, the head is configured to write a plurality of clearance-measurement data strings with differing bit inversion frequencies to the disk; the controller is configured to read out the plurality of clearance-measurement data strings using the head; and, the controller is configured to calculate the clearance between the head and the disk from clearance-measurement results done using the resolution of the plurality of clearance-measurement data strings. By this means, in accordance with embodiments of the present invention, a simple and accurate clearance measurement may be performed.

In another embodiment of the present invention, the controller is configured to read out a first clearance-measurement data string and a second measurement data string using the head; and, the controller is configured to calculate the clearance between the head and the disk from clearance-measurement results done using the respective resolutions of the first and second clearance-measurement data strings. By this means, in accordance with embodiments of the present invention, a simple and accurate clearance measurement may be performed.

In another embodiment of the present invention, the controller is configured to use a constant expressing the ratio between the rate of change in the clearance-measurement results due to deterioration in the first clearance-measurement data string and the rate of change in the clearance-measurement results due to deterioration in the second clearance-measurement data string to calculate the clearance between the head and the disk. By this means, in accordance with embodiments of the present invention, changes to the measured values due to deterioration in the clearance-measurement data strings may be more accurately corrected for.

In another embodiment of the present invention, the first clearance-measurement data string and second clearance-measurement data string are written to different data tracks. By this means, in accordance with embodiments of the present invention, a clearance measurement may be performed more efficiently and accurately.

In another embodiment of the present invention, the controller is configured to use the past results of clearance measurement and the current clearance-measurement results for the first clearance-measurement data string in the clearance calculation, and to correct for the effect of data deterioration in the first clearance-measurement data string. By this means, in accordance with embodiments of the present invention, a more accurate clearance measurement may be performed.

In another embodiment of the present invention, the controller is configured to perform a clearance measurement done using the resolution of the first clearance-measurement data string and clearance measurement done using the resolution of the second clearance-measurement data string at different times, and to calculate the ratio from these measurement results. By this means, in accordance with embodiments of the present invention, the ratio may be more accurately calculated.

In another embodiment of the present invention, the disk drive further includes a mechanism that adjusts clearance with the temperature sensor; and, the controller is configured to correct for at least part of clearance changes due to temperature before performing a clearance measurement by referring to the temperature detected by the temperature sensor and adjusting clearance with this mechanism. By this means, in accordance with embodiments of the present invention, a more accurate clearance measurement may be performed.

In accordance with other embodiments of the present invention, a method for measuring clearance between a head and a disk in a disk drive utilizes a head-slider that includes a slider that is configured to fly in proximity with the recording surface of the disk, and a head formed on the slider that is configured to access the disk. In accordance with embodiments of the present invention, the method includes reading out one or a plurality of clearance-measurement data strings from the disk recording surface; and, the method includes calculating the clearance between the head and the disk from clearance-measurement results done using a plurality of resolutions with different frequency components. By this means, in accordance with embodiments of the present invention, the effect of deterioration in clearance-measurement data strings is reduced in the clearance measurement. Thus, in accordance with embodiments of the present invention, the effect of thermal demagnetization in a clearance measurement may be reduced by reading out data strings from the disk.

In the following description of embodiments of the present invention, a HDD will be used as an example of a disk drive to describe an embodiment of the present invention. In the HDD, in accordance with embodiments of the present invention, the clearance between the magnetic-recording head and the magnetic-recording disk is adjusted using a heater element which is an example of a clearance adjustment mechanism. In accordance with embodiments of the present invention, in the specification the clearance control which controls the projection of the magnetic-recording head with heat from the heater element on the head-slider is referred to as thermal fly-height control (TFC). In accordance with embodiments of the present invention, variation in the amount of heat from the heater on the slider varies the thermal expansion of the magnetic-recording head, enabling the clearance to be adjusted.

In accordance with yet other embodiments of the present invention, the HDD reads out clearance-measurement data strings from the magnetic-recording disk using a read element, and measures clearance, or alternatively, associated variations in the clearance, with the amplitude of the read-back signal from the read element. In accordance with embodiments of the present invention, the HDD measures clearance using resolution in the read-back signal of the data string. In accordance with embodiments of the present invention, the HDD calculates values which express a variety of resolutions using different frequency components, and uses these to measure the clearance. By this means, in accordance with embodiments of the present invention, the influence of thermal demagnetization in the data strings is corrected for, and a more accurate clearance measurement may be performed. In accordance with embodiments of the present invention, the specification of the clearance measurement also includes measurement of changes to clearance in addition to simply measuring the clearance.

Figure 1:
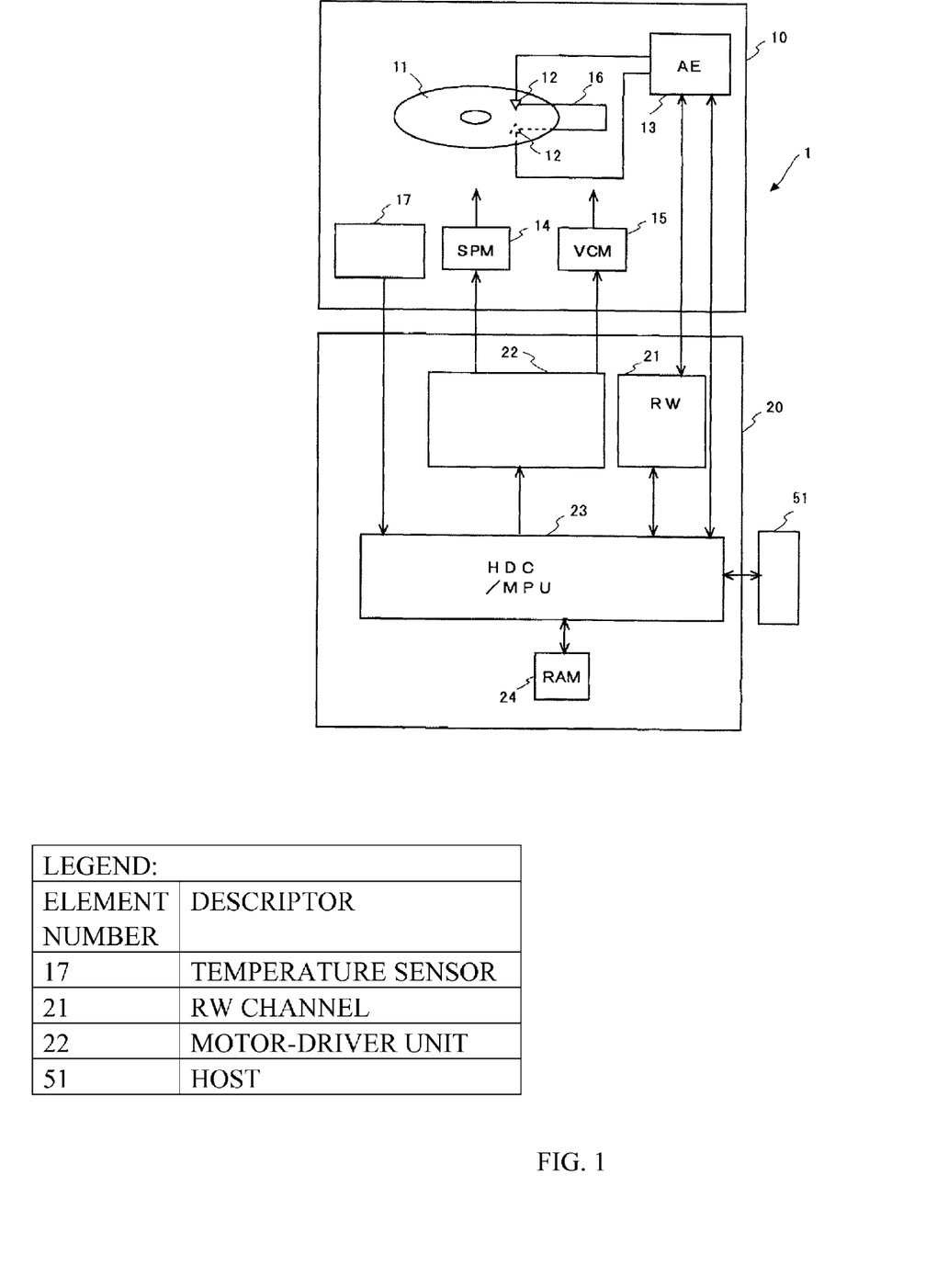
FIG. 1 is block diagram schematically illustrating the overall structure of the hard-disk drive (HDD), in accordance with an embodiment of the present invention.

With reference now to FIG. 1, in accordance with embodiments of the present invention, a block diagram is shown that illustrates the overall structure of the HDD 1. HDD 1 includes a disk enclosure (DE) 10, and a magnetic-recording disk 11, which is a disk that stores data. Spindle motor (SPM) 14 rotates magnetic-recording disk 11 at a specified angular speed. Head-slider 12 accesses magnetic-recording disk 11 and communicates with the recording surface of magnetic-recording disk 11. As used herein, "access" is a term of art that refers to operations in seeking a data track of a magnetic-recording disk and positioning a magnetic-recording head on the data track for both reading data from, and writing data to, a magnetic-recording disk. Each head-slider 12, which flies in proximity with the recording surface of the magnetic-recording disk, includes a magnetic-recording head that converts an electrical write signal to a magnetic signal written to the magnetic-recording disk 11 and converts a magnetic signal read back from the magnetic-recording disk 11 to an electrical read-back signal.

In accordance with embodiments of the present invention, the head-slider 12 expands and projects the magnetic-recording head with heat, and is provided with a heater for the TFC that adjusts the clearance from magnetic-recording disk 11, which is referred to by the term of art, "fly height." Each head-slider 12 is fixed to the tip of rotary actuator 16. Rotary actuator 16 is linked to a voice coil motor (VCM) 15, and moves head-slider 12 in a substantially radial direction over magnetic-recording disk 11 which rotates the head-slider by rotating to and fro about a pivot shaft. Rotary actuator 16 and VCM 15 are mechanisms which move head-slider 12.

Circuit elements are mounted on printed-circuit board (PCB) 20 on the outside of DE 10. Motor driver unit 22 drives SPM 14 and VCM 15 in accordance with control data from hard-disk controller/microprocessor unit (HDC/MPU) 23. Random-access memory (RAM) 24 has the function of a buffer which temporarily stores read data and write data. Arm electronic (AE) module 13 inside DE 10 chooses a head-slider 12 for access to magnetic-recording disk 11 from a plurality of head-sliders 12, amplifies the read-back signal and sends the read-back signal to read/write channel (RW channel) 21. Moreover, the recording signal from RW channel 21 is sent to selected head-slider 12. AE module 13 also supplies power to the heater of selected head-slider 12, and functions as an adjustment circuit which adjusts the amount of power to the heater.

RW channel 21 amplifies the read-back signal supplied from AE module 13 in the reading process so that the read-back signal reaches a set amplitude, and selects data from the read-back signal, performing a decoding process. The data read out contains both user data and servo data. The decoded read user data and servo data are supplied to HDC/MPU 23. Furthermore, RW channel 21 includes write data supplied from HDC/MPU 23 in the writing process, and then converts the encoded write data to a write signal, supplying the write signal to AE module 13.

HDC/MPU 23 is an example of a controller, executes overall control of HDD 1 and processes all the necessary data; HDC/MPU 23 provides the following functions: controlling the read/write process; managing command execution protocol; controlling the positioning of head-slider 12 using the servo signal, referred to by the term of art "servo control;" controlling the interface with host 51; performing defect management; and, processing error response if an error occurs. In particular, in accordance with embodiments of the present invention, HDC/MPU 23 performs TFC with temperature using the detected temperature from temperature sensor 17, and furthermore performs TFC in response to pressure variations. HDC/MPU 23 also performs clearance measurement by reading out data from the magnetic-recording disk 12 to enable accurate TFC. One embodiment of the present invention embraces within its scope this clearance measurement, which is next described.

In accordance with an embodiment of the present invention, once AE module 13 supplies current, in other words, electric power, to the heater of head-slider 12, the heat causes the magnetic-recording head to expand and protrude. When the quantity of heat from the heater increases, the thermal expansion and protrusion of the magnetic-recording head increases; and, the clearance between the magnetic-recording head and the magnetic-recording disk 11 decreases. In this way, the clearance between magnetic-recording head and magnetic-recording disk 11 varies according to the value of the power supplied to the heater.

In accordance with embodiments of the present invention, HDC/MPU 23 performs TFC with changes in temperature and pressure, for example, changes of pressure resulting from changes in altitude. The environmental conditions which affect clearance include humidity, as well as temperature and pressure; but, the description that follows will be restricted to clearance changes due to temperature changes and pressure changes. Data, in the form of coefficients, expressing the relationship between temperature and heater power and data, in the form of coefficients, expressing the relationship between pressure and heater power are set in the HDD 1; and, HDC/MPU 23 calculates heater power in accordance with temperature and pressure using these data.

Specifically, heater power P supplied to the heater is expressed as the sum, (P(t)+P(p)), of heater power, P(t), which is dependent on temperature and heater power, P(p), which is dependent on pressure. A constant term is built into either of the terms, which may be given by a formula, P(t), or P(p), and that the coefficient of the formula will vary according to environmental conditions such as temperature and pressure, head-slider 12, or radial position of the head-slider 12. In specific terms, heater power P is expressed by the following Formula 1:

$$P=(TDP \times \text{eff}[\text{DEFAULT}]-\text{Target}-dt \times t\_\text{comp}-dp \times p\_\text{comp})/\text{eff} \quad \text{(Formula 1)}$$

where the terms in Formula 1 are defined as follows: eff is the efficiency of the heater power; eff[DEFAULT] is the heater power efficiency in default mode; TDP is the heater power with which head-slider 12 and magnetic-recording disk 11 come into contact in default mode; Target is the target clearance; dt is the change in temperature from the default state; t_comp is the rate of change in clearance with respect to temperature; dp is the change of pressure from the default state; and, p_comp is the rate of change in clearance with respect to pressure.

The symbols for t_comp and p_comp are reversed. TDP, t_comp and p_comp typically vary with their radial position. The default environmental conditions are typically 30° centigrade (C.), which is room temperature, and one atmosphere, which corresponds to an altitude of 0 meters (m) above sea level. Determining the variations in these values with the default conditions as a reference is synonymous with determining the respective values.

HDD 1 is provided with at least one temperature sensor 17; and, HDC/MPU 23 determines heater power P (t) corresponding to temperature detected by temperature sensor 17, and the set coefficient. In an embodiment of the present invention, the HDD 1 includes temperature sensor 25; but, HDD 1 may not include a pressure sensor, in order to reduce the number of parts included in HDD 1. For this reason, HDC/MPU 23 measures pressure, corresponding to changes in pressure, by measuring clearance, corresponding to changes in clearance.

Clearance varies with pressure. For this reason HDC/MPU 23 measures clearance for pressure measurement, and determines changes in pressure, dp, from these clearance changes. As clearance varies with temperature, HDC/MPU 23 is able to calculate changes in clearance due to pressure changes by correcting for changes in clearance due to temperature changes from the measured clearance changes, for example, by removing the difference from the default value. In this way, changes in values and current values are made to correspond by prescribing default conditions with a set default temperature and pressure, and by prescribing the default clearance in these default conditions.

Clearance changes corrected for temperature express changes in pressure. HDC/MPU 23 controls heater power, P, according to changes in pressure indicated by changes in the clearance, which correspond to changes in pressure from the default state. Specifically, as shown in Formula 1, data expressing the relationship between pressure changes, dp, expressed by changes in clearance and heater power, P, which is a coefficient, is set in HDD 1, with HDC/MPU 23 determining heater power for the pressure using this coefficient and the measured pressure changes.

In one embodiment of the present invention, HDD 1 measures clearance and the changes in clearance from the default clearance using the read-back signal from head-slider 12. More specifically, clearance is measured from the read-back signal resolution, for example, from the resolution of frequency components in the read-back signal. For example, the resolution can be expressed as a ratio between specific low-frequency signals and high-frequency signals in the read-back signal.

There are various values used for calculating the amplitude of the read-back signal to determine, in other words, to measure, changes in the pressure or changes in clearance due to a pressure; but, among these the use of resolution to measure clearance, and corresponding changes in clearance, is one of the most accurate methods. When the clearance is small, the amplitude of the high-frequency components of the read-back signal is relatively large, and resolution increases; but, when clearance is larger, the resolution is smaller.

By ensuring that resolution is subject to a suitable linear transformation, the clearance may be approximated with a linear function of resolution. The linear function connecting resolution and clearance typically differs for each of the head-sliders 12. The relationship between the resolution of each head-slider 12 and clearance is determined in a test process during the manufacture of HDD 1; and, control parameters are registered in HDD 1 based on this relationship.

For example, HDC/MPU 23 can analyze the read-back signal and determine resolution by calculating the ratio between the gain of one high-frequency component, for example, from the amplitude of the one high-frequency component, and the gain of one low-frequency component, for example, from the amplitude of the one low-frequency component. Alternatively, resolution can be determined by calculating the ratio between the integral value of one high-frequency band and the integral value of one low-frequency band. Embodiments of the present invention do not specify a particular restriction on the method of calculating resolution.

For HDC/MPU 23 to perform the above processes, an additional function separate for functions for normal actions is utilized. Furthermore, the MPU utilizes a large amount of processing time to perform these processes. For this reason, in another embodiment of the present invention, the measurement of resolution is performed using the functions supplied to HDD 1. RW channel 21 has a function which adjusts the read-back waveform for the read-back signal to extract accurate data from the read-back signal. RW channel 21 performs this waveform rectification using a digital filter.

In the digital filter incorporated in RW channel 21, a digital filter is able to correct the frequency components of the read-back signal, for example, by means of an adaptive cosine filter. RW channel 21 corrects the tap values of the digital filter from the measurement results for the read-back signal. The corrected parameters can be associated with the resolution, and as parameters which express this, can approach a linear function with clearance. This digital filter is known in the art.

HDC/MPU 23 is able to determine changes to clearance by referring to these corrected parameters. In what follows, these corrected values will be referred to by the term of art, "Kgrad." In the test process during manufacture, the relationship between Kgrad and clearance is determined for each head-slider 12. Kgrad is a value which expresses resolution, and the symbols for changes in clearance are the reverse of those for resolution. In other words, Kgrad decreases together with a reduction in clearance.

In the following description, HDC/MPU 23 determines clearance, corresponding to clearance changes, by referring to Kgrad, which is a value associated with resolution and one of the channel parameters; but, HDC/MPU 23 may also use other channel parameters corresponding to resolution. For example, where RW channel 21 is provided with a digital filter for restoring a read-back signal with a specific pattern to a standard pattern, HDC/MPU 23 can use the corrected values for the resolution component in the correction coefficient for the digital filter tab to determine clearance.

The coefficients and constants of the function expressed in Formula 1, appearing on the right-hand side of Formula 1, are determined during a test process in the manufacture of HDD 1. In other words, the test process when HDD 1 is manufactured determines the relationship between heater power and clearance, between temperature and clearance, and furthermore between temperature-corrected Kgrad, in other words, pressure and clearance, and stores the data expressing these in HDD 1. In addition to clearance changes caused by temperature changes, Kgrad varies with temperature changes in the characteristics of RW channel 21. Temperature correction for Kgrad is corrected in accordance with these changes. HDC/MPU 23 is able to determine a suitable value for heater power from the temperature detected by temperature sensor 17 and the measured value for Kgrad, corresponding to a measured value for pressure, using these sets of data.

HDC/MPU 23 can obtain Kgrad from RW channel 21, whenever required. In order to more accurately measure clearance changes and control clearance on the basis of these changes, in one embodiment of the present invention, HDC/MPU 23 regularly measures the clearance. In another embodiment of the present invention, HDC/MPU 23 performs a clearance measurement at set time intervals, in addition to measuring clearance during the initial setting process at start-up, which occurs during a power on reset (POR) process.

Figure 2:
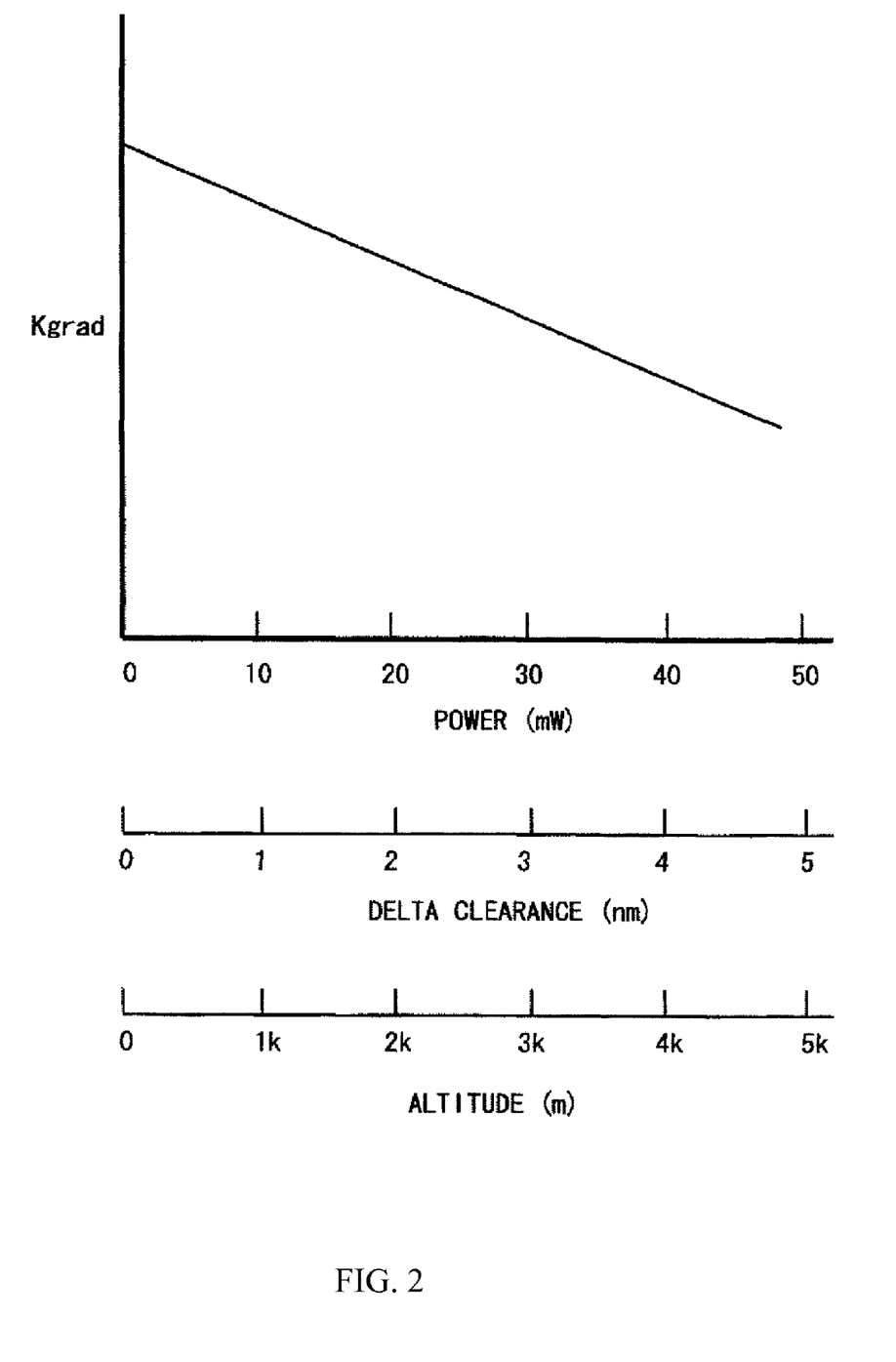
FIG. 2 is a diagram schematically illustrating the relationship between Kgrad, clearance changes, heater power and pressure, which may be associated with the altitude at which the HDD operates, in accordance with an embodiment of the present invention.

With reference now to FIG. 2, in accordance with embodiments of the present invention, a diagram is shown that schematically illustrates the relationship between Kgrad, clearance changes, heater power and pressure, which may be associated with the altitude at which the HDD operates. There is a substantive linear relationship between Kgrad, clearance change quantities and pressure changes, and correspondingly altitude changes. The relationship between each of these can approach a linear function. Kgrad decreases with reductions in clearance. Kgrad is a value which expresses resolution, but changes to changes in clearance are different from resolution, itself. HDC/MPU 23 is able to determine the other values from any of the above values, and any one value can be made to express another value.

Clearance changes, and correspondingly clearance, can be expressed with heater power, nanometers (nm), as units of the physical clearance, or Kgrad, each of which is a value respectively expressing clearance. The relationship between the above values is determined during the test process in the manufacture of HDD 1, and stored in HDD 1. HDC/MPU 23 can calculate the current physical clearance in nanometers, or alternatively, altitude in kilometers (km), corresponding to pressure, given in units of atmospheres (atm), by measuring Kgrad.

HDC/MPU 23 can measure Kgrad by reading out from the read element of the magnetic-recording head a data string for measuring Kgrad from magnetic-recording disk 11. This Kgrad measurement data string is a data string for measuring the clearance using resolution. HDC/MPU 23 can further perform a calculation process using a set function from the measured value for Kgrad, and calculate difference, dp, between the default value, for example, 1 atm, and the current pressure. HDC/MPU 23 calculates the heater power for clearance control from this, dp, and the detected temperature of temperature sensor 17 using Formula 1.

In another embodiment of the present invention, Kgrad is written in advance to magnetic-recording disk 11 in the manufacturing process for HDD 1. In the manufacturing process, temperature, pressure, and other environmental elements such as the conditions where HDD 1 is being used are appropriately controlled, enabling Kgrad values to be stored for suitable conditions; and, a Kgrad measurement data string can be written to the magnetic recording disk 11, which is easy to determine. In another embodiment of the present invention, the data tracks used in measuring Kgrad may be a data track with superior characteristics for measuring Kgrad. For this reason, in one embodiment of the present invention, a region for recording user data may not be used, such that the region cannot be accessed from host 51. By this means, deterioration in data track characteristics can be avoided through repeated overwriting.

The Kgrad measurement data string deteriorates with thermal demagnetization as time passes, and the spectrum of the frequency of this read-back signal also changes, as reflected in the intensity distribution in the frequency. Specifically, thermal demagnetization progresses faster in a perpendicular magnetic-recording (PMR) disk for low signal frequency components, than for high signal frequency components. In magnetic-recording disks using in-plane recording, the reverse is true. In the current HDDs PMR is widely used. For this reason, in the description that follows PMR HDD is discussed.

With PMR, resolution will increase with the passage of time through thermal demagnetization for the same clearance. Kgrad will decrease with thermal demagnetization of the measurement data string. The effect of thermal demagnetization is more pronounced for low signal frequency components. For this reason, when there is a difference in the read-back signal spectra between two Kgrad measurement data strings, these two Kgrad measurement data strings exhibit different changes with thermal demagnetization.

Figure 3:
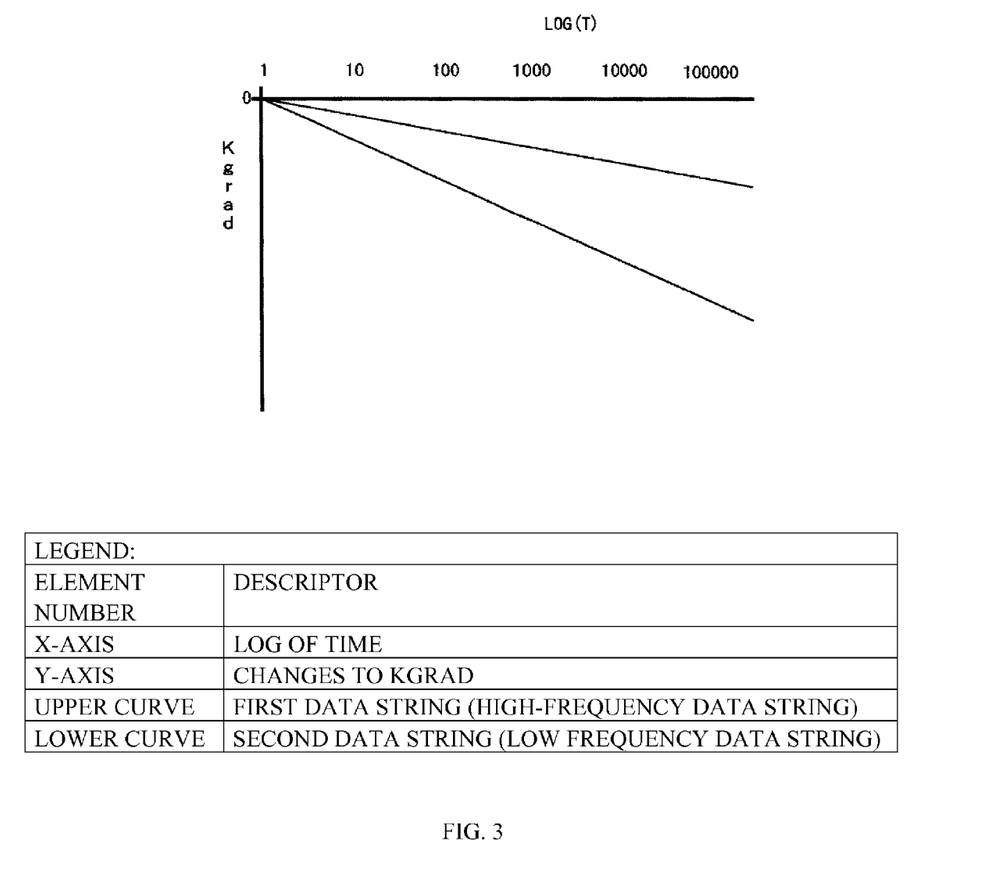
FIG. 3 is a graph expressing deterioration in Kgrad measurement data strings, in accordance with an embodiment of the present invention.

With reference now to FIG. 3, in accordance with embodiments of the present invention, a schematic relationship is shown between elapsed time and the degree of changes in measured values for Kgrad for two Kgrad measurement data strings. The y-axis shows changes to Kgrad, with the x-axis showing the logarithm of elapsed time. As shown in FIG. 3, where temperature remains constant, changes to Kgrad with thermal demagnetization approach a function proportional to the logarithm of time. The proportional constant is negative. Thermal demagnetization is dependent on temperature; and the more temperature rises, the faster thermal demagnetization proceeds. In the graph of FIG. 3, the higher the temperature gets the more the absolute value for the incline of the functions increases. However, the ratio between the inclinations of the two functions is fixed and independent of temperature. This point is subsequently described.

The first measurement data string includes a great deal of relatively high frequency components, with the second measurement data string including more relatively low frequency components. For this reason, as shown in FIG. 3, the rate of deterioration of Kgrad is greater for the second measurement data string than for the first measurement data string. In other words, the thermal demagnetization of the second measurement data string is faster than the thermal demagnetization of the first measurement data string. The frequency spectrum in the read-back signal of the Kgrad measurement data string varies with the bit inversion frequency for the recorded data. When the bit inversion frequency rises, the ratio of the higher components in the read-back signal increases.

There are two ways of raising the bit inversion frequency. One method raises the bit inversion frequency in the Kgrad measurement data string. The bit inversion frequency, associated with the bit inversion ratio, can be expressed as the bit inversion number per set number of bits. For example, the value for the bit inversion number in the measurement data string divided by the number of bits in the data string can be used. Where two identical bit pattern data strings are written to the same zone, their resolution, as indicated by Kgrad, is essentially identical for the same clearance. If the bit inversion frequency for one of the data strings is made higher, the resolution for this data string is higher than the resolution for the other data string. In other words, Kgrad for one data string is smaller than Kgrad for the other data string.

For example, 0 and 1 vary for each single bit, in other words, for a data string in which the direction of magnetization changes with each bit in a magnetic recording layer, where the bit inversion frequency is at a maximum, and all of the bits are at 0 or at 1, the bit inversion frequency is lowest. Actual recorded measurement data strings have an appropriate pattern that follows the design of HDD 1. Another method of raising the bit inversion frequency is to raise the bit recording frequency. If the data recording frequency is different between two data string with the same bit pattern, their resolution, as indicated by Kgrad, will be different.

Figure 4:
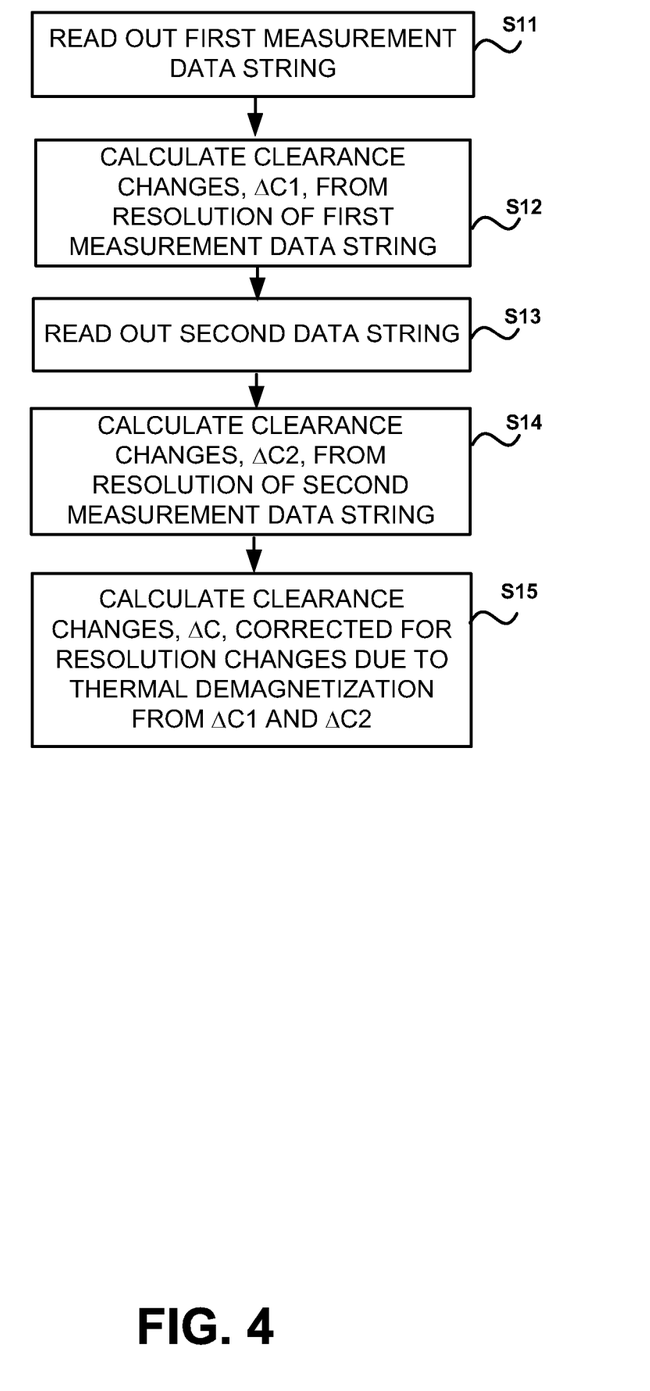
FIG. 4 is a flowchart showing the process of clearance measurement, in accordance with an embodiment of the present invention.

With reference now to FIG. 4, in accordance with embodiments of the present invention, a flowchart is shown for the process of clearance measurement. In another embodiment of the present invention, HDC/MPU 23 uses the fact that the resolution change ratio due to thermal demagnetization is dependent on the bit inversion frequency for clearance measurement. There are two Kgrad measurement data strings comprising first measurement data string and second measurement data string on the recording surface of magnetic-recording disk 11. The frequency spectra in these read-back signals are different.

At S11, HDC/MPU 23 reads out the first measurement data string using head-slider 12. RW channel 21 calculates the Kgrad corresponding to the resolution of the first measurement data string. At S12, HDC/MPU 23 calculates clearance changes ΔC1 from this Kgrad. The clearance changes are the changes to clearance from the default state.

Next, at S13, HDC/MPU 23 reads out the second measurement data string using the same head-slider 12. RW channel 21 calculates the Kgrad corresponding to the resolution of the second measurement data string. At S14, HDC/MPU 23 calculates clearance changes ΔC2 from this Kgrad. At S15, HDC/MPU 23 calculates the actual clearance changes ΔC from clearance changes ΔC1 determined from first measurement data string and clearance changes ΔC2 determined from second measurement data string. These clearance changes ΔC are the values for correcting changes caused by thermal demagnetization of the measured values ΔC1, ΔC2 for the two clearance changes.

A practical description will now be given of the method of calculating clearance measurement values corrected for thermal demagnetization in operation S15. HDC/MPU 23 uses the difference between the values, which is a sensitivity, of the thermal demagnetization of the two measurement data strings. The measured value ΔC1 for the changes in clearance for the first measurement data string can be expressed in Formula 2:

$$\Delta C1 = a1 \times \log(T) = \Delta C \quad \text{(Formula 2)}$$

where the terms in Formula 2 are defined as follows: a1 is the thermal demagnetization coefficient for the first measurement data string; variable, T, is the elapsed time since the first measurement data string was written; and, ΔC is the true clearance changes.

Thus, a1×log (T) is a coefficient indicating deterioration in the data string due to thermal demagnetization. As was described with reference to FIG. 3, at a constant temperature, the apparent clearance changes due to thermal demagnetization are proportional to a logarithm of time. Thus, the measured value for clearance changes is the sum of the apparent changes due to thermal demagnetization, a1×log(T), and the true clearance changes, ΔC. As described above, the effect of thermal demagnetization changes with temperature. In Formula 2 above, during the passage of time, T, temperature is supposed to remain constant. However, the influence of thermal demagnetization can be corrected for accurately even with this assumption. This point is subsequently described.

Measured value ΔC2 for clearance changes due to the second measurement data string can be expressed in Formula 3:

$$\Delta C2 = a2 \times \log(T) = \Delta C \quad \text{(Formula 3)}$$

where the terms in Formula 3 are defined as follows: a2 is the thermal demagnetization coefficient for the second measurement data string; variable, T, is the elapsed time since the second measurement data string was written; and, ΔC is the true clearance changes.

Thus, a2×log (T) is a coefficient indicating deterioration in the data string due to thermal demagnetization. The presumption that the temperature remains constant during the elapsed time, T, is the same as for Formula 2. The second measurement data string has a different read-back signal frequency spectrum from that of the first measurement data string; and, coefficient, a2, which determines the influence of thermal demagnetization, is a different value from that of coefficient, a1.

By eliminating log(T) from the above Formulas 2 and 3, the true value, ΔC, for the clearance changes can be expressed by the following Formula 4:

$$\Delta C = ((a2/a1) \times \Delta C1 - \Delta C2)/((a2/a1)-1) \quad \text{(Formula 4)}$$

Where (a2/a1) is taken as α, the above Formula 4 becomes the following Formula 5:

$$\Delta C = (\alpha \times \Delta C1 - \Delta C2)/(\alpha-1) \quad \text{(Formula 5)}$$

HDC/MPU 23 can calculate the true clearance changes using Formula 5 from coefficient, α, first measurement data string clearance change measurement value, ΔC1, and the measured value, ΔC2, for changes in clearance in the second measurement data string.

Here coefficient, α, is the ratio between thermal demagnetization coefficients a1 and a2 for the two measurement data strings. As was explained for FIG. 3, the influence of the thermal demagnetization changes with temperature; and, the higher the temperature, the greater the influence. For this reason, a1 and a2 change with temperature. However, according to research done by the inventors, this ratio, a2/a1=α, does not effectively vary with temperature. Even if there is a change in temperature, the ratio of the influence of the thermal demagnetization with respect to the two measurement data strings for each temperature is constant. For this reason the thermal demagnetization coefficient ratio, α, is preset in HDD 1 in advance; and, HDC/MPU 23 is able to calculate accurate clearance changes adjusted for the thermal demagnetization from the measured results for the clearance using the two measurement data strings.

In another embodiment of the present invention, HDC/MPU 23 uses the past measured results and current measured results to reduce measurement variation in the thermal demagnetization. There are no rapid changes in thermal demagnetization. As a result, by removing noise from the measured values for thermal demagnetization in the measurement of clearance, a more accurate clearance measurement may be performed.

As the true clearance changes, ΔC, can be calculated from Formula 5, HDC/MPU 23 is able to estimate the influence of thermal demagnetization in clearance changes in the first measurement data string and second measurement data string. Specifically, the effect of thermal demagnetization in the first measurement data string is (ΔC1−ΔC)=decay 1; and, the effect of thermal demagnetization in the second measurement data string is (ΔC2−ΔC)=decay 2. These are the amounts of change in the clearance measurement due to thermal demagnetization in first measurement data string and second measurement data string. In the above Formulas 2 and 3, these are a1×log(T), and a2×log(T).

HDC/MPU 23 applies weighting to the thermal demagnetization in the past measurements and the thermal demagnetization in current measurements, when calculating the value. Specifically, the integral value S_k__1 for the measurement of the current first measurement data string is expressed in the following Formula 6:

$$S\_k\_1 = \beta \times S\_(k-1)\_1 + (1-\beta) \times \text{decay 1} \quad \text{(Formula 6)}$$

where the terms in Formula 6 are defined as follows: S_(k−1)__1 is the integral value calculated for the immediately preceding clearance measurement; decay 1 is the change in clearance measurement values with thermal demagnetization calculated for the current measurement; β is the weight coefficient, and is a positive value less than 1.

The calculation for the above Formula 6 corresponds to a low pass filter process using an IIR filter, and the integral value S_k__1 corresponds to a value which has been corrected by removing noise from the effect of thermal demagnetization in the first measurement data string. HDC/MPU 23 calculates the true clearance, associated with changes, from the measured clearance value, corresponding to a measured value of changes, in the first measured data string and this integral value S_k__1. Specifically, HDC/MPU 23 calculates the true clearance, corresponding to changes, using the following Formula 7:

$$\Delta C = \Delta C1 - S\_k\_1 \quad \text{(Formula 7)}$$

HDC/MPU 23 may calculate the true clearance changes, ΔC, from the measurement results for the second measurement data string instead of calculating with the results of measurement for the first measurement data string (se Formula 6 and Formula 7). The method of calculation is identical to the method described for the first measurement data string (see Formula 6 and Formula 7). Alternatively, HDC/MPU 23 may calculate the average value for the true clearance changes, ΔC, from the measured results for the second measurement data string and the true clearance changes, ΔC, calculated from the results of measuring the first measurement data string.

In another embodiment of the present invention, two measurement data strings are recorded in the same, or nearby, data tracks. By this means, the effect of thermal demagnetization appear differently in the measurement data strings can thereby be avoided. When different data tracks are written to, in one embodiment of the present invention, the data tracks are not adjacent data tracks, but have at least one track between the data tracks. By this means, interference between the measurement data strings can be avoided; and, a more accurate clearance measurement can be ensured. For this reason, in one embodiment of the present invention, a track is written to that is separated by several tracks from a Kgrad measurement data string in the same zone. The zone is an area for which the data recording frequency is the same.

When forming two measurement data strings in the same data track, the two measurement data strings may be divided into two sections in a continuous data track with a single measurement data track formed in the respective sections; alternatively, a data track may be divided into a plurality of sections comprising a single section, or a plurality of sections; and, part of the first measurement data string and part of the second measurement data string respectively recorded in each section.

In the above process the clearance measurement was done by a single head-slider 12. In another embodiment of the present invention, where HDD 1 has a plurality of head-sliders 12, HDC/MPU 23 performs a clearance measurement, which may be a pressure measurement, with all of the head-sliders 12, and determines the pressure, or alternatively, pressure changes, from these results. For example, a measurement result expressing a median value from the measurement results of a plurality of head-sliders 12 may be used; and, TFC performed thereafter.

As is clear from the above description, to measure clearance changes due to pressure changes, clearance changes due to temperature are compensated for. There are two methods of compensation. In one of these methods, the degree of clearance changes due to temperature changes, from the default value, is calculated from the temperature detected by temperature sensor 17. This change is then removed from the measured value for the clearance changes. By removing the clearance changes due to temperature change, the measured value for clearance changes due to pressure changes and thermal demagnetization effects can be determined.

In another method, the actual clearance is adjusted according to temperature changes using TFC. In this way, changes in the actual clearance can be limited to those due to pressure changes only. Specifically, HDC/MPU 23 calculates changes in the clearance due to temperature changes from the temperature detected by temperature sensor 17, and supplies power to the heater to cancel out these changes. The functions and coefficients to calculate these clearance changes (data) are set in advance in HDD 1. Measured values for the clearance changes can be thus limited to the effect of pressure changes and thermal demagnetization effects by compensating for the clearance changes due to temperature change using TFC.

In another embodiment of the present invention, HDC/MPU 23 uses TFC in accordance with temperature changes. HDC/MPU 23 may use both a calculated temperature correction, and a TFC temperature correction. By using TFC temperature correction, the clearance in pressure measurement will not vary greatly with the temperature conditions, enabling a more accurate pressure measurement, and corresponding clearance measurement.

As is clear from the above description, to correct for the effect of thermal demagnetization, HDD 1 is preset with the thermal demagnetization coefficient ratio, $\alpha$. In another embodiment of the present invention, HDC/MPU 23 performs clearance measurement in a test process during the manufacture of HDD 1, and determines the thermal demagnetization coefficient ratio, $\alpha$, from the results of measurement.

Specifically, at a suitable stage in the test process HDC/MPU 23 performs a clearance measurement using the first measurement data string and a first clearance measurement using the second measurement data string. In another embodiment of the present invention, this measurement may be performed at an early stage in the test process. Thereafter, HDC/MPU 23 performs a clearance measurement using the first measurement data string and a second clearance test using the second measurement data string. Between the first measurement and the second measurement, deterioration caused by thermal demagnetization progresses in the first and second measurement data strings. Thus, HDC/MPU 23 is able to calculate thermal demagnetization coefficient ratio, $\alpha$, by comparing the measurement results of these two measurements.

In the above test, HDD 1 is mounted within a test device. In the first measurement and the second measurement, the environmental conditions, for example, temperature and pressure, can be kept effectively the same. Thus, the difference between the measurement results in the second clearance test can be considered to be solely dependent on the thermal demagnetization. If the change in the measured value for clearance between the first measurement and the second measurement of the first measurement data string is taken as $\Delta Cm1$, and the change in the measured value for clearance between the first measurement and the second measurement of the second measurement data string is taken as $\Delta Cm2$, the following Formula 8 can be derived from Formula 5:

$$\Delta C = (\alpha \times \Delta Cm1 - \Delta Cm2)/(\alpha - 1) = 0 \quad \text{(Formula 8)}$$

HDC/MPU 23 is able to calculate the thermal demagnetization coefficient ratio, $\alpha$, from the relationship in Formula 8.

When consideration is given to the effect of pressure changes between the first measurement and the second measurement, HDC/MPU 23 obtains pressure detection values from an external pressure sensor, and using the formula preset in the design of HDD 1, calculates the clearance changes for the pressure changes. Using this value, HDC/MPU 23 can calculate the clearance changes due to thermal demagnetization accurately by correcting the measured clearance value.

A description of certain embodiments of the present invention has been given above; but, the invention is not limited to such embodiments. According to the inventors, changes, additions and adaptations to the elements of the above described embodiments of the present invention can be made within the spirit and scope of embodiments of the present invention.

For example, as described above, for embodiments of the present invention, HDC/MPU 23 performs measurements of clearance using Kgrad calculated by RW channel 21. In this embodiment of the present invention, a single Kgrad is calculated from a single clearance-measurement data string. Separate from this embodiment of the present invention, a circuit within HDC/MPU 23, or alternatively, RW channel 21, may calculate two different values expressing resolution from a single clearance-measurement data string. For example, HDC/MPU 23 can calculate two values expressing resolution using different frequency components of the clearance-measurement data string.

Moreover, embodiments of the present invention can be applied to HDDs with clearance adjustment mechanisms other than TFC, such as piezoelectric elements and adjustment mechanisms similar to piezoelectric elements. In addition, the clearance measurement of the invention can be applied to the measurement of clearance changes due to factors other than pressure. Moreover, the clearance measurement of the invention can be applied to HDDs which do not have a clearance adjustment mechanism, or to disks drives other than HDDs.

In accordance with embodiments of the present invention, the thermal demagnetization coefficient ratio may be used to calculate clearance with the effect of thermal demagnetization removed. In this way, true clearance changes can be calculated appropriately in a simple calculation. However, embodiments of the present invention may also be able to use a different method of calculation from one based on the thermal demagnetization coefficient ratio. Moreover, the method of removing noise from the effect of thermal demagnetization, which cause changes to the measured value, is not limited to the above calculation. In accordance with embodiments of the present invention, the HDD is able to correct for the effect of thermal demagnetization by substituting past measurement results and present measurement results in other methods of calculation. For example, in accordance with embodiments of the present invention, the HDD may calculate changes to measurement values using a set number of past measurement values, or a median value only within a prescribed range.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive, comprising:
a disk;
a head, said head configured to access said disk;
a head-slider, said head-slider comprising said head and configured to fly in proximity to a recording surface of said disk;
a moving mechanism, said moving mechanism configured to move said head-slider over said disk, and to support said head-slider; and
a controller, said controller configured to read out at least one from a plurality of clearance-measurement data strings from said recording surface of said disk using said head, and to calculate a clearance between said head and said disk from clearance-measurement results obtained from a plurality of resolutions with different frequency components;
wherein said head is configured to write a plurality of clearance-measurement data strings with differing bit inversion frequencies to said disk;
wherein said controller is configured to read out said plurality of clearance-measurement data strings using said head; and
wherein said controller is configured to calculate said clearance between said head and said disk from clearance-measurement results obtained from said resolution of said plurality of clearance-measurement data strings.

2. The disk drive of claim 1,
wherein said controller is configured to read out a first clearance-measurement data string and a second measurement data string using said head; and
wherein said controller is configured to calculate said clearance between said head and said disk from clearance-measurement results obtained from said respective resolutions of said first and second clearance-measurement data strings.

3. The disk drive of claim 2, wherein said first clearance-measurement data string and second clearance-measurement data string are written to different data tracks.

4. The disk drive of claim 2, wherein said controller is configured to use past results of clearance measurement and current results of clearance measurement for said first clearance-measurement data string in a clearance calculation, and to correct for an effect of data deterioration in said first clearance-measurement data string.

5. The disk drive of claim 2, wherein said controller is configured to use a constant expressing a ratio between a rate of change in said clearance-measurement results due to deterioration in said first clearance-measurement data string and a rate of change in said clearance-measurement results due to deterioration in said second clearance-measurement data string to calculate said clearance between said head and said disk.

6. The disk drive of claim 5, wherein said controller is configured to perform a clearance measurement obtained from said resolution of said first clearance-measurement data string and clearance measurement obtained from said resolution of said second clearance-measurement data string at different times, and to calculate said ratio from said measurement results.

7. The disk drive of claim 1, said disk drive further comprising:
a mechanism that adjusts clearance with a temperature sensor; and
wherein said controller is configured to correct for at least part of clearance changes due to temperature before performing a clearance measurement by referring to a temperature detected by said temperature sensor and adjusting clearance with said mechanism.

8. A method for measuring clearance between a head and a disk in a disk drive, said method comprising:
reading out at least one from a plurality of clearance-measurement data strings from recording surface of said disk;
calculating said clearance between said head and said disk from clearance-measurement results obtained from a plurality of resolutions with different frequency components;
writing a plurality of clearance-measurement data strings with differing bit inversion frequencies to said disk; and
reading out said plurality of clearance-measurement data strings obtained from said head; and
calculating said clearance between said head and said disk from clearance-measurement results obtained from said resolution of said plurality of clearance-measurement data strings.

9. The method of claim 8, further comprising:
reading out a first clearance-measurement data string and a second measurement data string obtained from said head; and
calculating said clearance between said head and said disk calculated from clearance-measurement results obtained from said respective resolutions of said first and second clearance-measurement data strings.

10. The method of claim 9, further comprising:

writing said first clearance-measurement data string and second clearance-measurement data string into different data tracks.

11. The method of claim 9, further comprising:

using past results of clearance measurement and current results of clearance measurement for said first clearance-measurement data string in said clearance calculation; and correcting for an effect of data deterioration in said first clearance-measurement data string.

12. The method of claim 9, further comprising:

using a constant expressing a ratio between a rate of change in clearance-measurement results due to deterioration in said first clearance-measurement data string and a rate of change in clearance-measurement results due to deterioration in said second clearance-measurement data string to calculate said clearance between said head and said disk.

13. The method of claim 12, further comprising:

performing a clearance measurement obtained from resolution of said first clearance-measurement data string and a clearance measurement obtained from said resolution of said second clearance-measurement data string at different times; and calculating said ratio from said clearance-measurement results.

14. The method of claim 8, further comprising:

adjusting clearance with a clearance adjustment mechanism with reference to a temperature detected by a temperature sensor to correct for at least part of clearance changes due to temperature before performing a clearance measurement.

* * * * *